US007553093B2

United States Patent
(12) Tsai

(10) Patent No.: US 7,553,093 B2
(45) Date of Patent: Jun. 30, 2009

(54) CAMERA MODULE

(75) Inventor: Kun-Jung Tsai, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 221 days.

(21) Appl. No.: 11/448,572

(22) Filed: Jun. 7, 2006

(65) Prior Publication Data

US 2007/0071437 A1 Mar. 29, 2007

(30) Foreign Application Priority Data

Sep. 23, 2005 (CN) .......................... 200510037497

(51) Int. Cl.
*G03B 15/00* (2006.01)

(52) U.S. Cl. ........................................ 396/351; 396/72

(58) Field of Classification Search .................. 396/89, 396/327, 351, 117, 447, FOR. 705, FOR. 797; 359/212, 223, 220, 857, 871
See application file for complete search history.

(56) References Cited

U.S. PATENT DOCUMENTS 6,654,063 B1 * 11/2003 Tadatsu ...................... 348/373
7,493,032 B2 * 2/2009 Chang ......................... 396/72
2002/0102102 A1 * 8/2002 Watanabe et al. ............. 396/89

* cited by examiner

*Primary Examiner*—Rochelle-Ann J Blackman
*Assistant Examiner*—Autumn Parker
(74) *Attorney, Agent, or Firm*—Steven M. Reiss

(57) ABSTRACT

A camera module (100) includes a lens unit (20), an image sensor (80), an optical group (406*a*, 406*b*), and at least a first light directing unit and a second light unit directing each having two reflective surfaces. The optical group includes a first reflective surface facing the lens unit and a second reflective surface facing the image sensor. The reflective surfaces of the first and second light directing units are positioned corresponding to the first and second reflective surfaces of the optical group. A distance between the first light directing unit and the optical group is different from that between the second light directing unit and the optical group. The optical group is movable relative to the first and second light directing unit. When the optical group is moved to different positions, light from the lens unit is directed to the image sensor in different path.

20 Claims, 2 Drawing Sheets

202
20
204
100
400
40
603
60
602
406a
402
604a
606a
406b
606b
608
4042
4044
408
604b
404
80

CAMERA MODULE

BACKGROUND OF THE INVENTION

1. Field of the Invention

The present invention generally relates to camera modules and, more particularly, to a camera module which can be used with a portable electronic device such as a mobile phone or a PDA (personal digital assistant).

2. Discussion of the Related Art

With the rapid development of multimedia technology, use of digital devices such as digital still cameras ("still cameras") and digital video cameras ("video cameras") has become wide-spread in many countries. Mobile phones have improved both the number and the quality of the functions they can perform. Therefore, digital devices performing a wide variety of functions have been combined with mobile phones.

Currently, camera modules employed in most mobile phones and PDAs have fixed focal length and do not include an optical zoom function. In such a camera module, a focal length (represented by "f") is unchangeable. Thus, if we want to take pictures of objects with different apparent object distances (represented by "u"), i.e. an apparent distance between an object and a lens of the camera module, an image distance (represented by "v"), i.e. an apparent distance between an image and a lens of the camera module, should be changed according to the formula $1/u+1/v=1/f$. The image distance is often changed by changing a position of the lens or the image sensor. However, in this manner, changed length of the image distance is generally same as the changed distance between the lens group and the image sensor. Therefore, the camera module including the lens and the image sensor needs to occupy a large space to allow changing a position of the lens group or the image sensor. Thus, the camera module has a large size which makes it unsuitable for use in mobile phones and PDAs.

What is needed, therefore, is a camera module, which overcomes the above-described problems.

SUMMARY OF THE INVENTION

A camera module includes a lens unit, an image sensor, an optical group, and at least a first light directing unit having two reflective surfaces and a second light directing unit having two reflective surfaces. The optical group includes a first reflective surface and a second reflective surface. The first reflective surface of the optical group faces the lens unit and the second reflective surface of the optical group faces the image sensor. The reflective surfaces of the first and second light directing units are positioned corresponding to the first and second reflective surfaces of the optical group. A distance between the first light directing unit and the optical group is different from that between the second light directing unit and the optical group. The optical group is movable relative to the first and second light directing unit. When the optical group is moved to a first position, each reflective surface of the first light directing unit separately faces a corresponding reflective surface of the optical group, and the optical group and the first light directing unit reflect light to the image sensor. When the rotating member is moved to a second position, each reflective surface of the second light directing unit separately facing a corresponding reflective surface of the optical group, and the optical group and the second light directing unit reflect light to the image sensor. When the optical group is moved to a third position, light from the lens unit radiates on the image sensor directly.

Other advantages and novel features of preferred embodiments of the present invention will become more apparent from the following detailed description thereof when taken in conjunction with the accompanying drawings:

BRIEF DESCRIPTION OF THE DRAWINGS

Many aspects of the camera module can be better understood with reference to the following drawings. The components in the drawings are not necessarily drawn to scale, the emphasis instead being placed upon clearly illustrating the principles of the camera module. Moreover, in the drawings, like reference numerals designate corresponding parts throughout the several views.

DETAILED DESCRIPTION OF PREFERRED EMBODIMENTS

A camera module is disclosed to be applied in portable electronic devices such as mobile phones and PDAs, yet could be equally useful in "stand-alone" digital-based optical devices.

Figure 1:
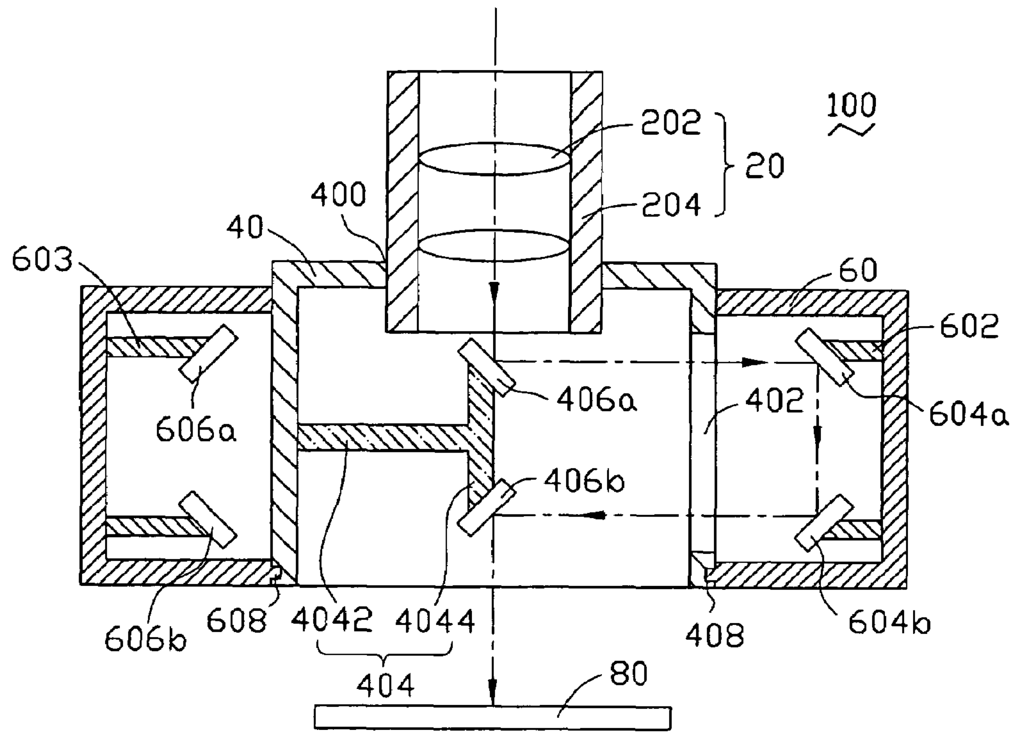
FIG. 1 is a cross-sectional view in accordance with a first preferred embodiment of a camera module with a first image distance.

Referring to FIG. 1, a first preferred embodiment of a camera module 100 includes a lens module (not labeled) and an image sensor 80. The lens module includes a lens unit 20, a rotating member 40 and a supporting member 60. The lens unit 20 is fixed relative to the rotating member 40 with adhesive or other similar means, and the rotating member 40 together with the lens unit 20 is rotatable relative to the supporting member 60.

The lens unit 20 includes a lens group 202 and a barrel 204. The barrel 204 is a hollow cylinder. The lens group 202 includes at least one lens mounted in the barrel 204.

The rotating member 40 is a hollow cylinder having an open end and an opposite partially opened end defining a hole 400. The rotating member 40 defines a through hole 402 in a sidewall thereof. An optical group (not labeled) including a first reflective element **406*a* and a second reflective element 406*b* is fixed relative to the rotating member 40. The first and second reflective elements 406*a*, 406*b* are connected to the rotating member 40 by a connecting member 404. The connecting member 404 is "T" shaped having a connecting portion 4042 connected to the sidewall of the rotating member 40 and a supporting portion 4044 perpendicular to the connecting portion 4042. The connecting portion 4042 is set perpendicular to an axis of the rotating member 40. Each of the first and second reflective elements 406*a*, 406*b* is fixed on a separate end of the supporting portion 4044. The first and second reflective elements 406*a*, 406*b* are slanted an angle of 45 degrees relative to the supporting portion 4044 of the connecting member 404 and are positioned opposite to the connecting portion 4042, and facing the through hole 402. The rotating member 40 further defines an annular groove 408** in an outer surface of the sidewall thereof.

The lens unit 20 is disposed in the partially opened end of the rotating member 40 and the image sensor 80 is disposed adjacent to the open end of the rotating member 40. As such, the first reflective element **406*a* has a reflective surface facing the lens unit 20 and the second reflective element 406***b* has a reflective surface facing the image sensor 80.

The supporting member 60 is a hollow cylinder having two opposite ends. Each of the ends defines an opening in its center. A first light directing unit including a third reflective element 604*a* and a fourth reflective element 604*b* and a second light directing unit including a fifth reflective element 606*a* and a sixth reflective element 606*b* are mounted in the supporting member 60. Each of the third and fourth reflective elements 604*a,* 604*b* is separately connected to the supporting member 60 by a first supporting arm 602. Each of the fifth and sixth reflective elements 606*a,* and 606*b* is separately connected to the supporting member 60 by a second supporting arm 603. The first and second supporting arms 602, 603 have differing length. The first and second supporting arms 602, 603 are perpendicular to an axis of the supporting member 60. The third and forth reflective elements 604*a* and 604*b* are each disposed at an end of one of the first supporting arms 602, and face a center of the supporting member 60. The fifth and sixth reflective elements 606*a* and 606*b* are each disposed at an end of one of the second supporting arms 603, and face a center of the supporting member 60. The third, forth, fifth and sixth reflective elements 604*a,* 604*b,* 606*a,* and 606*b* are slanted at an angle of 45 degrees relative to the supporting arms 602, 603.

The rotating member 40 is mounted in the opening of the supporting member 60. The supporting member 60 forms an annular protrusion 608 for engaging with the groove 408 of the rotating member 40, thereby reducing friction between the supporting member 60 and the rotating member 40. The first, third and fifth reflective elements 406*a,* 604*a,* and 606*a* are positioned at a similar height along the axis of the rotating member 40, and the second, fourth and sixth reflective elements 406*b,* 604*b,* and 606*b* are positioned at a similar height along the axis of the rotating member 40.

Figure 2:
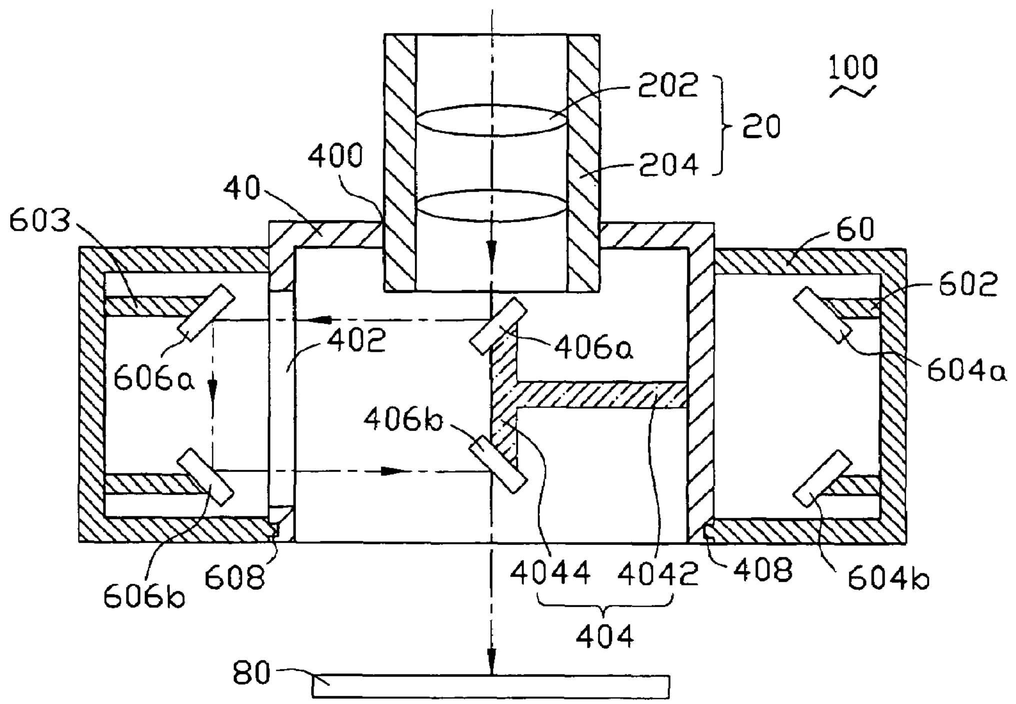
FIG. 2 is similar to FIG. 1, but showing the camera module with a second image distance.

Referring to FIG. 1, when imaging at a first image distance to take pictures of objects at a first distance, the rotating member 40 rotates to a first position and the first light directing unit is selected for directing light, that is, the first reflective element 406*a* faces the third reflective element 604*a,* and the second reflective element 406*b* faces the fourth reflective element 604*b.* In this state, light enters the lens unit 20 and radiates onto the first reflective element 406*a*. Then the light is reflected by the first reflective element 406*a,* the third reflective element 604*a,* the fourth reflective element 604*b,* and the second reflective element 406*b,* in that order, and finally radiates onto the image sensor 80. Referring to FIG. 2, when imaging at a second image distance to take pictures of objects at a second distance, the rotating member 40 rotates to a second position and the second light directing unit is selected for directing light, that is, the first reflective element 406*a* faces the fifth reflective element 606*a,* and the second reflective element 406*b* faces the sixth reflective element 606*b.* In this state, light can enter the lens unit 20 and radiate onto the first reflective element 406*a.* The light then can be reflected by the first reflective element 406*a,* the fifth reflective element 606*a,* the sixth reflective element 606*b,* and the second reflective element 406*b,* in that order, and finally radiates onto the image sensor 80. The light path distance is changed as the length of the first and second supporting arms 602, 603 are different, thereby changing the image distance.

Figure 3:
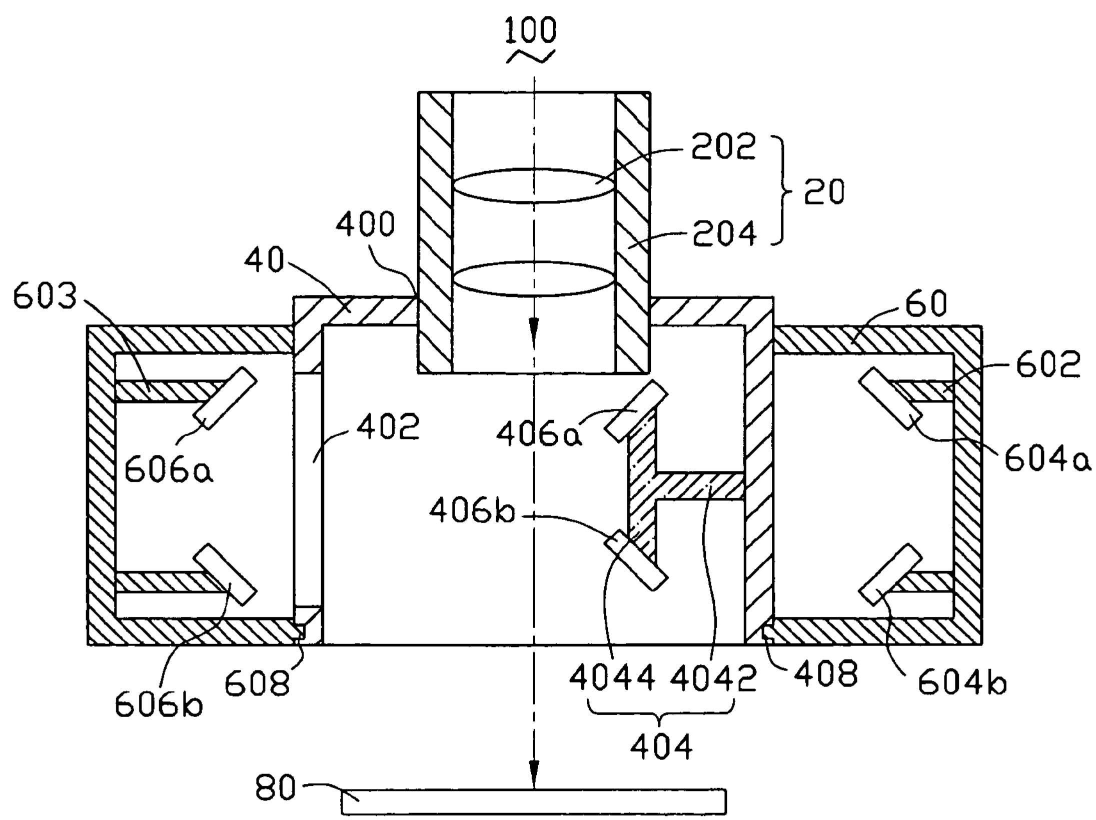
FIG. 3 is similar to FIG. 1, but showing the camera module with a third image distance.

Furthermore, the connecting portion 4042 of the connecting member 404 may be retractable. Referring to FIG. 3, when the connecting portion 4042 is retracted, light radiates onto the image sensor 80 directly without being reflected by any reflective element. Therefore, the camera module 100 has a third image distance to take pictures of objects at a third distance.

Figure 4:
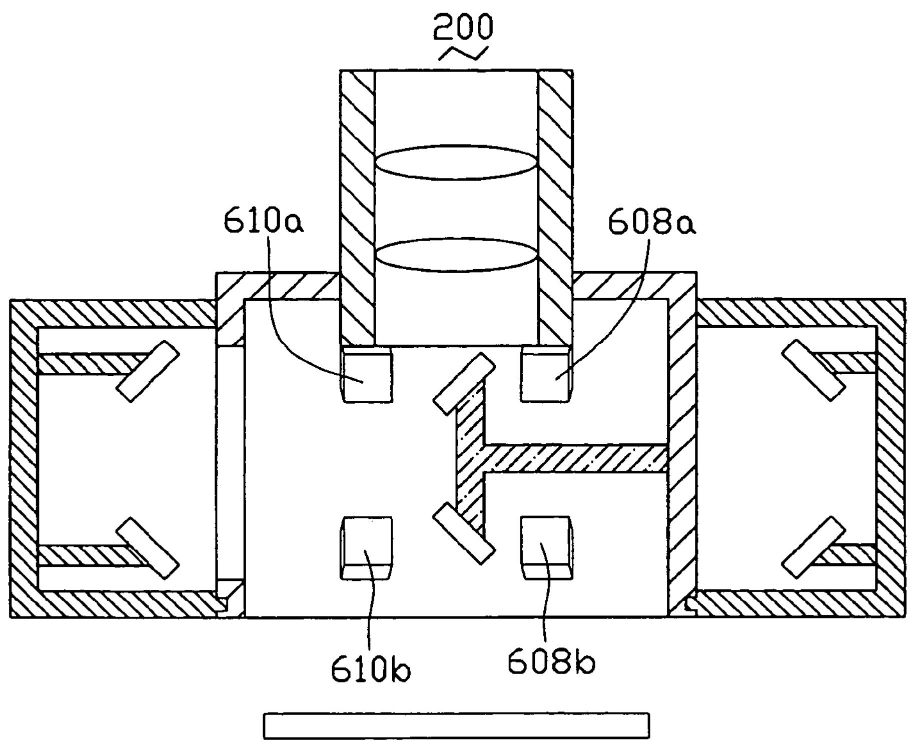
FIG. 4 is a cross-sectional view in accordance with a second preferred embodiment of a camera module.

In a second embodiments, more than two light directing units may be provided. For example, referring to FIG. 4, a third light directing unit including a seventh reflective element 608*a* and an eighth reflective element 608*b* and a fourth light directing unit including a ninth reflective element 610*a* and a tenth reflective element 610*b* are provided in a camera module 200. The seventh, eighth, ninth and tenth reflective elements 608*a,* 608*b,* 610*a,* and 610*b* are each connected to the supporting member 60 by their respective supporting arms. The lengths of the supporting arm supporting the seventh and eighth reflective elements 608*a,* 608*b,* the supporting arm supporting the ninth and tenth reflective elements 610*a,* 610*b,* the first supporting arm 602 and the second supporting arm 603 are all different to each other.

In alternative embodiments, the light directing units may include one element having two reflective surfaces for replacing the two reflective elements.

It is believed that the embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

I claim:

1. A camera module comprising:

a lens unit comprising a barrel and a lens group mounted in the barrel;

an image sensor;

a rotating member fixed relative to the lens unit;

an optical group fixed in the rotating member, the optical group comprising a first reflective element and a second reflective element, the first reflective element having a reflective surface facing the lens unit, and the second reflective element having a reflective surface facing the image sensor, the reflective surfaces of the first and second reflective elements being slanted relative to an axis of the barrel; and a supporting member being rotatable relative to the rotating member, at least a first light directing unit and a second tight dfrecting unit each having two reflective elements fixed relative to the supporting member, each of the reflective elements having a reflective surface facing the optical group and being slanted relative to the axis of the barrel, a distance between the reflective elements of the first light directing unit and the optical group being different from that between the reflective elements of the second light directing unit end the optical group.

2. The camera module as claimed in claim 1, wherein the rotating member is a hollow cylinder having an open end and an opposite partially opened end defining a hole, and the rotating member defines a through hole in the sidewall thereof for allowing light emitted from the optical group to radiate onto the light directing units.

3. The camera module as claimed in claim 2, wherein the first and second reflective elements are connected to the rotating member by a connecting member.

4. The camera module as claimed in claim 3, wherein the lens unit is disposed in the partially opened end of the rotating member and the image sensor is disposed adjacent to the open end of the rotating member.

5. The camera module as claimed in claim 3, wherein the first and second reflective elements are slanted at an angle of 45 degrees relative to the axis of the barrel and face the through hole.

6. The camera module as claimed in claim 5, wherein the connecting member is "T" shaped having a connecting portion connected to the sidewall of the rotating member and a supporting portion pexpendicular to the connecting portion, the connecting portion is set perpendicular to an axis of rowing member, and each of the first and second reflective elements is fixed on a separate end of the supporting portion.

7. The camera module as claimed in claim 1, wherein the supporting member is a hollow cylinder having two opposite ends, each of the ends defines an opening in its center, the rotating member is mounted in one opening of the supporting member.

8. The camera module as claimed in claim 7, wherein each of the reflective elements of the first directing unit is separately connected to the supporting member by a first supporting arm, each of the reflective elements of the second directing unit is separately connected to the supporting member by a second supporting arm with a length different to that of the first supporting arm.

9. The camera module as claimed in claim 8, wherein the reflective elements of the first and second directing units are slanted at an angle of 45 degrees relative to the supporting arms.

10. A lens module comprising:

a lens unit comprising a barrel and a lens group mounted in the barrel;

a rotating member;

an optical group fixed in the rotating member, the optical group comprising a first reflective element and a second reflective element the first reflective element having a reflective surface facing the lens unit, and the second reflective element having a reflective surface opposing the reflective surface of the first reflective element, the reflective surfaces of the first and second reflective elements being slanted relative to an axis of the barrel; and a supporting member rotatably mounted relative in the rotating member a plurality of light directing units including a first light directing unit and a second light directing unit each having at least two reflective elements fixed relative to the supporting member, each of the reflective elements having a reflective surface facing the optical group and being slanted relative to the axis of the barrel, a light path length of light directed by the first light directing unit and the optical group being different from a light path length of light directed by the second light directing unit and the optical group.

11. The lens module as claimed in claim 10, wherein the rotating member is a hollow cylinder having an open end and an opposite partially opened end with a hole, the rotating member defines a through hole in the sidewall thereof for allowing light emitted from the optical group to radiate onto the light directing units.

12. The lens module as claimed in claim 11, wherein the first and second reflective elements are connected to the rotating member by a connecting member.

13. The lens module as claimed in claim 12, wherein the first and second reflective elements are slanted at an angle of 45 degrees relative to the axis of the barrel and face the through hole.

14. The lens module as claimed in claim 13, wherein the connecting member is "T" shaped having a connecting portion connected to the sidewall of the rotating member and a supporting portion perpendicular to the connecting portion, the connecting portion is set perpendicular to an axis of rotating member, each of the first and second reflective elements is fixed on a separate end of the supporting portion.

15. The lens module as claimed in claim 10, wherein the supporting member is a hollow cylinder having two opposite ends, each of the ends defines an opening at the center, the rotating member is mounted in one opening of the supporting member.

16. The lens module as claimed in claim 15, wherein each of the reflective elements of the first directing unit is separately connected to the supporting member by a first supporting arm, each of the reflective elements of the second directing unit is separately connected to the supporting member by a second supporting arm with a different length from the first supporting arm.

17. The lens module as claimed in claim 16, wherein the reflective elements of the first and second directing units are slanted an angle of 45 degrees relative to the supporting arms.

18. A camera module comprising:

a lens unit;

an image sensor;

an optical group comprising a first reflective surface and a second reflective surface, the first reflective surface facing the lens unit and the second reflective surface facing the image sensor; and at least a first light directing unit having two reflective surfaces and a second light directing unit having two reflective surfaces, the reflective surfaces of the first and second light directing units positioned corresponding to the first and second reflective surfaces of the optical group, a distance between the first light directing unit and the optical group being different from that between the second light directing unit and the optical group, the optical group being movable relative to the first and second light directing unit;

wherein when the optical group is moved to a first position, each reflective surface of the first light directing unit separately faces a corresponding reflective surface of the optical group, the optical group and the first light directing unit reflect light to the image sensor, when the rotating member is moved to a second position, each reflective surface of the second light directing unit separately facing a corresponding reflective surface of the optical group, the optical group and the second light directing unit reflect light to the image sensor, when the optical group is moved to a third position, light from the lens unit radiates on the image sensor directly.

19. The camera module as claimed in claim 18, wherein the optical group is fixed to a rotating member, the first and second light directing units are fixed to a supporting member.

20. The camera module as claimed in claim 18, wherein the reflective surfaces are slanted at an angle of 45 degrees relative to an axis of the lens unit.

* * * * *